US009564053B2

(12) United States Patent
Koshizen

(10) Patent No.: US 9,564,053 B2
(45) Date of Patent: Feb. 7, 2017

(54) SYNCHRONIZED DRIVING ASSIST APPARATUS AND SYNCHRONIZED DRIVING ASSIST SYSTEM

(71) Applicant: HONDA MOTOR CO., LTD., Minato-ku, Tokyo (JP)

(72) Inventor: Takamasa Koshizen, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 14/371,038

(22) PCT Filed: Jan. 10, 2013

(86) PCT No.: PCT/JP2013/050344
§ 371 (c)(1),
(2) Date: Jul. 8, 2014

(87) PCT Pub. No.: WO2013/105620
PCT Pub. Date: Jul. 18, 2013

(65) Prior Publication Data
US 2015/0019116 A1 Jan. 15, 2015

(30) Foreign Application Priority Data

Jan. 12, 2012 (JP) .................. 2012-004176
Apr. 10, 2012 (JP) .................. 2012-089364

(51) Int. Cl.
G06F 19/00 (2011.01)
G06G 7/70 (2006.01)
(Continued)

(52) U.S. Cl.
CPC ............. G08G 1/161 (2013.01); B60K 31/00 (2013.01); B60K 31/0008 (2013.01);
(Continued)

(58) Field of Classification Search
CPC .... G08G 1/0104; G08G 1/0112; G08G 1/161; G06F 17/00; G06F 17/14; B60K 31/0008; B60W 2550/306
(Continued)

(56) References Cited

U.S. PATENT DOCUMENTS

2010/0023614 A1* 1/2010 Lewis ................... G06F 15/173
709/224
2010/0060482 A1* 3/2010 Emam ...................... G08G 1/09
340/905
2011/0301779 A1* 12/2011 Shida ................... G01S 5/0072
701/1

FOREIGN PATENT DOCUMENTS

CN 101480954 A 7/2009
CN 101825886 A 9/2010
(Continued)

OTHER PUBLICATIONS

International Search Report (PCT/ISA/210) from International Application PCT/JP2013/050344 with a mailing date of Apr. 2, 2013.
(Continued)

Primary Examiner — Isaac Smith
(74) Attorney, Agent, or Firm — Carrier Blackman & Associates, P.C.; Joseph P. Carrier; Jeffrey T. Gedeon

(57) ABSTRACT

A synchronized driving assist apparatus includes: a first acceleration power spectrum acquisition section that acquires a first acceleration power spectrum according to acceleration of a first vehicle; a second acceleration power spectrum acquisition section that acquires a second acceleration power spectrum according to acceleration of a second vehicle; a cross power spectrum calculation section that calculates a cross power spectrum between the first vehicle and the second vehicle by using the first acceleration power spectrum and the second acceleration power spectrum; a
(Continued)

coherence calculation section that calculates coherence from the cross power spectrum; and a correlation evaluation section that evaluates correlation in a synchronized driving of the first vehicle and the second vehicle on the basis of the coherence.

11 Claims, 10 Drawing Sheets

(51) Int. Cl.
    *G06G 7/76* (2006.01)
    *G08G 1/16* (2006.01)
    *B60K 31/00* (2006.01)
    *G08G 1/0967* (2006.01)
    *B60W 30/165* (2012.01)
    *B60W 30/16* (2012.01)
    *F02D 29/02* (2006.01)

(52) U.S. Cl.
    CPC .......... *B60W 30/16* (2013.01); *B60W 30/165* (2013.01); *G08G 1/096716* (2013.01); *G08G 1/096725* (2013.01); *G08G 1/096741* (2013.01); *G08G 1/096775* (2013.01); *G08G 1/163* (2013.01); *G08G 1/164* (2013.01); *B60K 2031/0033* (2013.01); *B60W 2550/306* (2013.01); *B60W 2550/408* (2013.01); *B60W 2750/308* (2013.01); *F02D 29/02* (2013.01)

(58) Field of Classification Search
    USPC .................................. 701/110, 117; 340/905
    See application file for complete search history.

(56) References Cited

FOREIGN PATENT DOCUMENTS

| CN | 102194314 A | 9/2011 | |
| CN | 102310864 A | 1/2012 | |
| DE | EP 0795454 A1 * | 9/1997 | .............. B61L 3/002 |
| JP | 2002-123894 A | 4/2002 | |
| JP | 2005-206034 A | 8/2005 | |
| JP | 2008-111686 A | 5/2008 | |
| JP | 2008-155740 A | 7/2008 | |
| JP | 2009-505501 A | 2/2009 | |
| KR | 10-2010-0100-612 A | 9/2010 | |
| WO | 2007/021722 A2 | 2/2007 | |
| WO | 2010/084569 A1 | 7/2010 | |

OTHER PUBLICATIONS

Office Action with a mailing date of Jun. 15, 2015 issued in the corresponding CN Patent Application 2013800049929.

* cited by examiner

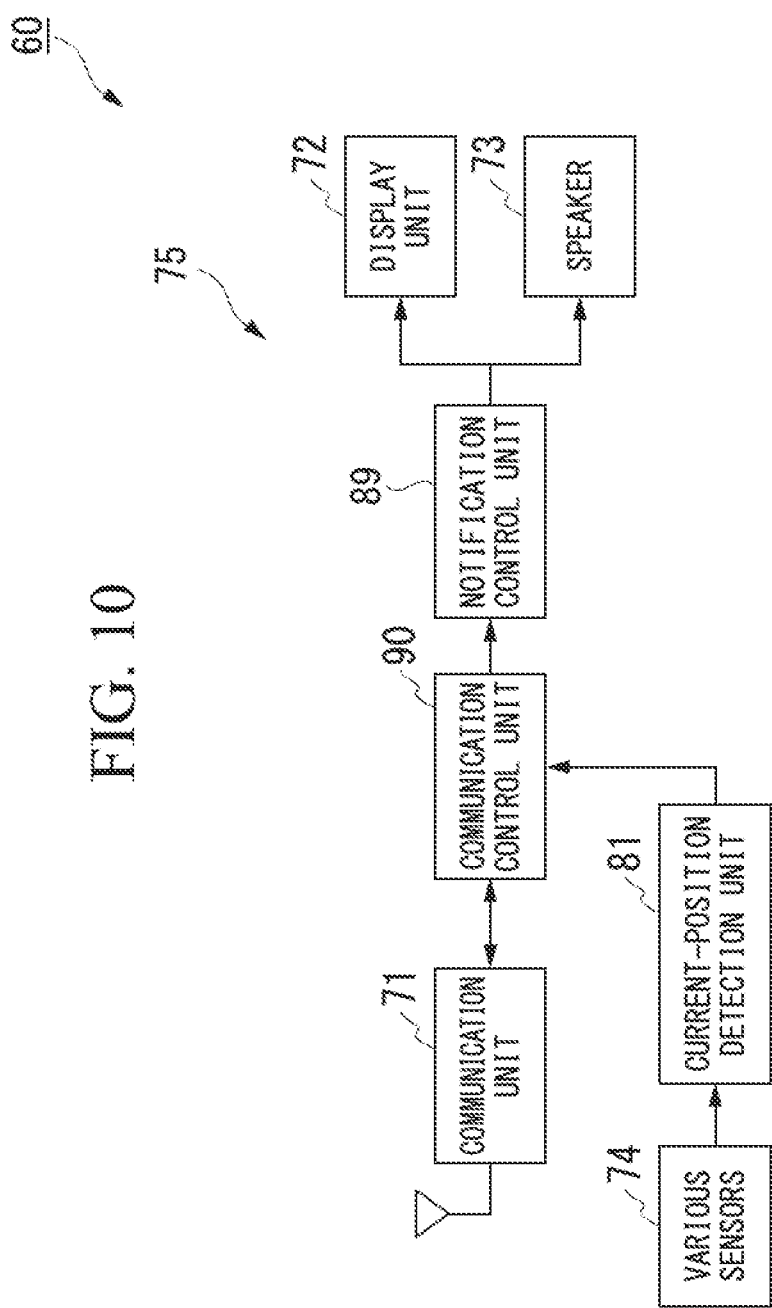

SYNCHRONIZED DRIVING ASSIST APPARATUS AND SYNCHRONIZED DRIVING ASSIST SYSTEM

TECHNICAL FIELD

This invention relates to a synchronized driving assist apparatus and a synchronized driving assist system.

Priority is claimed on Japanese Patent Application No. 2012-004176 filed on Jan. 12, 2012, and Japanese Patent Application No. 2012-089364 filed on Apr. 10, 2012, the contents of which are incorporated herein by reference.

BACKGROUND

In the related art, for example, a control system which keeps an inter-vehicle distance constant by controlling an output of a following vehicle corresponding to information of a throttle opening degree of a preceding vehicle to synchronize the output change timing between the preceding vehicle and the following vehicle is known (for example, refer to Patent Document 1).

RELATED ART DOCUMENTS

Patent Documents

[Patent Document 1] Japanese Unexamined Patent Application, First Publication No. 2008-155740

SUMMARY OF INVENTION

Problems to be Solved by the Invention

In the control system according to the above-described related art, because the throttle opening degree of the following vehicle is changed in synchronization with the throttle opening degree of the preceding vehicle, for example, even in the case that an inappropriate accelerator operation is performed in the preceding vehicle, the driving state of the following vehicle is changed in accordance with this inappropriate accelerator operation, and inadequate driving state propagates between a plurality of vehicles, which may lead to traffic congestion.

In view of the foregoing, an object of an aspect of the present invention is to provide a synchronized driving assist apparatus and a synchronized driving assist system which can appropriately assist a synchronized driving.

Means for Solving the Problem

A synchronized driving assist apparatus and a synchronized driving assist system according to an aspect of the present invention employ the following configurations in order to achieve the aforementioned object.

(1) A synchronized driving assist apparatus according to an aspect of the present invention includes: a first acceleration power spectrum acquisition section that acquires a first acceleration power spectrum according to acceleration of a first vehicle; a second acceleration power spectrum acquisition section that acquires a second acceleration power spectrum according to acceleration of a second vehicle; a cross power spectrum calculation section that calculates a cross power spectrum between the first vehicle and the second vehicle by using the first acceleration power spectrum and the second acceleration power spectrum; a coherence calculation section that calculates coherence from the cross power spectrum; and a correlation evaluation section that evaluates correlation in a synchronized driving of the first vehicle and the second vehicle on the basis of the coherence.

(2) In the aspect of the above (1), the correlation evaluation section may evaluate that the correlation in the synchronized driving is high in the case that the coherence is higher than a first predetermined value, and may evaluate that the correlation in the synchronized driving is low in the case that the coherence is lower than a second predetermined value.

(3) In the aspect of the above (2), the synchronized driving assist apparatus may further include a control section that outputs a driving control signal used to maintain a current driving operation or a notification signal which performs notification to a driver in the case that the correlation evaluation section evaluates that the correlation in the synchronized driving is high, and that outputs a driving control signal used to change a current driving operation or a notification signal which performs notification to a driver in the case that the correlation evaluation section evaluates that the correlation in the synchronized driving is low.

(4) In the aspect of the above (3), the synchronized driving assist apparatus may further include an inter-vehicle distance acquisition section that acquires an inter-vehicle distance between the first vehicle and the second vehicle, wherein the control section may output a driving control signal used to change a current driving operation or a notification signal which performs notification to a driver, depending on the inter-vehicle distance between the first vehicle and the second vehicle, in the case that the correlation evaluation section evaluates that the correlation in the synchronized driving is low.

(5) In the aspect of the above (3) or (4), the control section may output an automatic driving control signal that controls an automatic driving as the driving control signal.

(6) In the aspect of the above (5), the control section may output a control signal that commands to match an actual vehicle speed with a target vehicle speed, or a control signal that commands to match an actual inter-vehicle distance between the first vehicle and the second vehicle with a target inter-vehicle distance, as the automatic driving control signal.

(7) In the aspect of any one of the above (1) to (6), the synchronized driving assist apparatus may further include a portable electronic apparatus which is provided with at least any one of a communication section that performs communication with the outside in order to acquire at least the first acceleration power spectrum or the second acceleration power spectrum, a notification section that performs notification to a driver, and an arithmetic processing section that performs arithmetic processing according to the synchronized driving.

(8) In the aspect of the above (7), the portable electronic apparatus may perform all communication according to the synchronized driving between each of the first vehicle and the second vehicle and the outside by the communication section, and may perform all notification according to the synchronized driving to each driver of the first vehicle and the second vehicle by the notification section.

(9) In the aspect of the above (7) or (8), the arithmetic processing section of the portable electronic apparatus may further include a driving control section that outputs an automatic driving command signal which commands to perform an automatic driving according to the synchronized driving depending on an evaluation result of the correlation evaluation section.

(10) A synchronized driving assist system according to another aspect of the present invention includes the first vehicle and the second vehicle in which the synchronized driving assist apparatus according to any one of the above (1) to (9) is installed.

(11) A synchronized driving assist system according to another aspect of the present invention includes: the synchronized driving assist apparatus according to any one of the above (1) to (9); and a server apparatus that is capable of communicating with a plurality of vehicles including the first vehicle and the second vehicle.

Advantage of the Invention

According to the aspect of the above (1), the cross power spectrum and the coherence are calculated from the power spectrum of acceleration of each vehicle which is capable of being acquired in real time and easily, and the correlation in the synchronized driving is evaluated on the basis of the coherence.

Thereby, for example, an additional configuration such as an external sensor that detects the outside of each vehicle is not required, and it is possible to prevent an increase of the cost required for the apparatus configuration. Moreover, it is possible to evaluate the correlation in the synchronized driving accurately and with high reliability while preventing an increase of the calculation load.

Then, on the basis of this evaluation result, it is possible to appropriately assist the synchronized driving, and it is possible to reduce the load of the driving operation, to optimize the control timing of the driving state of each vehicle, and to suppress the occurrence of traffic congestion or resolve the traffic congestion which has occurred.

In addition, according to the evaluation result of the correlation of the synchronized driving on the basis of the coherence, for example, even in the case that there is a possibility that the ego vehicle is involved in traffic congestion due to the influence from other vehicles despite that there is no factor in the ego vehicle to produce the traffic congestion, it is possible to prevent the ego vehicle from actually being involved in the traffic congestion.

According to the aspect of the above (2), it is possible to evaluate the correlation in the synchronized driving in real time and easily on the basis of the coherence.

According to the aspect of the above (3), by prompting the driver to maintain or change the current driving operation depending on the result of the evaluation of the correlation in the synchronized driving, it is possible to prevent the assist of the synchronized driving from providing a feeling of strangeness to the driver, and to suitably reflect the intension of the driver in the driving state of each vehicle.

According to the aspect of the above (4), in the case that it is evaluated that the correlation in the synchronized driving is low, by prompting the driver to change the current driving operation, corresponding to the inter-vehicle distance, it is possible to further appropriately assist the synchronized driving.

According to the aspect of the above (5), by controlling such an automatic driving that maintains or enhances the correlation of the synchronized driving, it is possible to assist the synchronized driving accurately.

Moreover, because the correlation on the basis of the coherence corresponding to the acceleration power spectrum has a highly real-time feature, there may be a case where it is difficult for the driver to switch the driving operation in accordance with this response speed. Even in such a case, by automatically controlling the driving, it is possible to easily achieve the most suitable synchronized driving.

According to the aspect of the above (6), by commanding a target vehicle speed or a target inter-vehicle distance of such an automatic driving that maintains or enhances the correlation of the synchronized driving, it is possible to easily achieve the most suitable synchronized driving.

According to the aspect of the above (7), by performing at least any one of communication, notification, and arithmetic processing according to the synchronized driving by using the portable electronic apparatus which is carried by the driver or the occupant of the vehicle, or the like, it is possible to improve the versatility.

According to the aspect of the above (8), it is possible to make it unnecessary to preliminarily install an apparatus which is responsible for communication and notification according to the synchronized driving in the vehicle.

According to the aspect of the above (9), by outputting an automatic driving command signal which commands such an automatic driving that maintains or enhances the correlation of the synchronized driving from the portable electronic apparatus, it is possible to improve the convenience and the versatility.

According to the aspect of the above (10), it is possible to appropriately assist the synchronized driving between the first vehicle and the second vehicle, and it is possible to reduce the load of the driving operation, to optimize the control timing of the driving state of each vehicle and to suppress the occurrence of traffic congestion or resolve the traffic congestion which has occurred.

Moreover, in the case that a portable electronic apparatus which is responsible for at least part of the function of the synchronized driving assist apparatus is included, it is possible to simplify the configuration of the in-vehicle apparatus which is required to be preliminarily installed in the vehicle.

According to the aspect of the above (11), it is possible to reduce the processing load according to the synchronized driving in the vehicle.

Moreover, it is possible to easily and appropriately assist the synchronized driving among a plurality of vehicles which exist in a broad range.

BRIEF DESCRIPTION OF THE DRAWINGS

FIG. 10 is a block diagram of a portable electronic apparatus according to the fourth modified example of the embodiment of the present invention.

DESCRIPTION OF THE EMBODIMENTS

Figure 1:
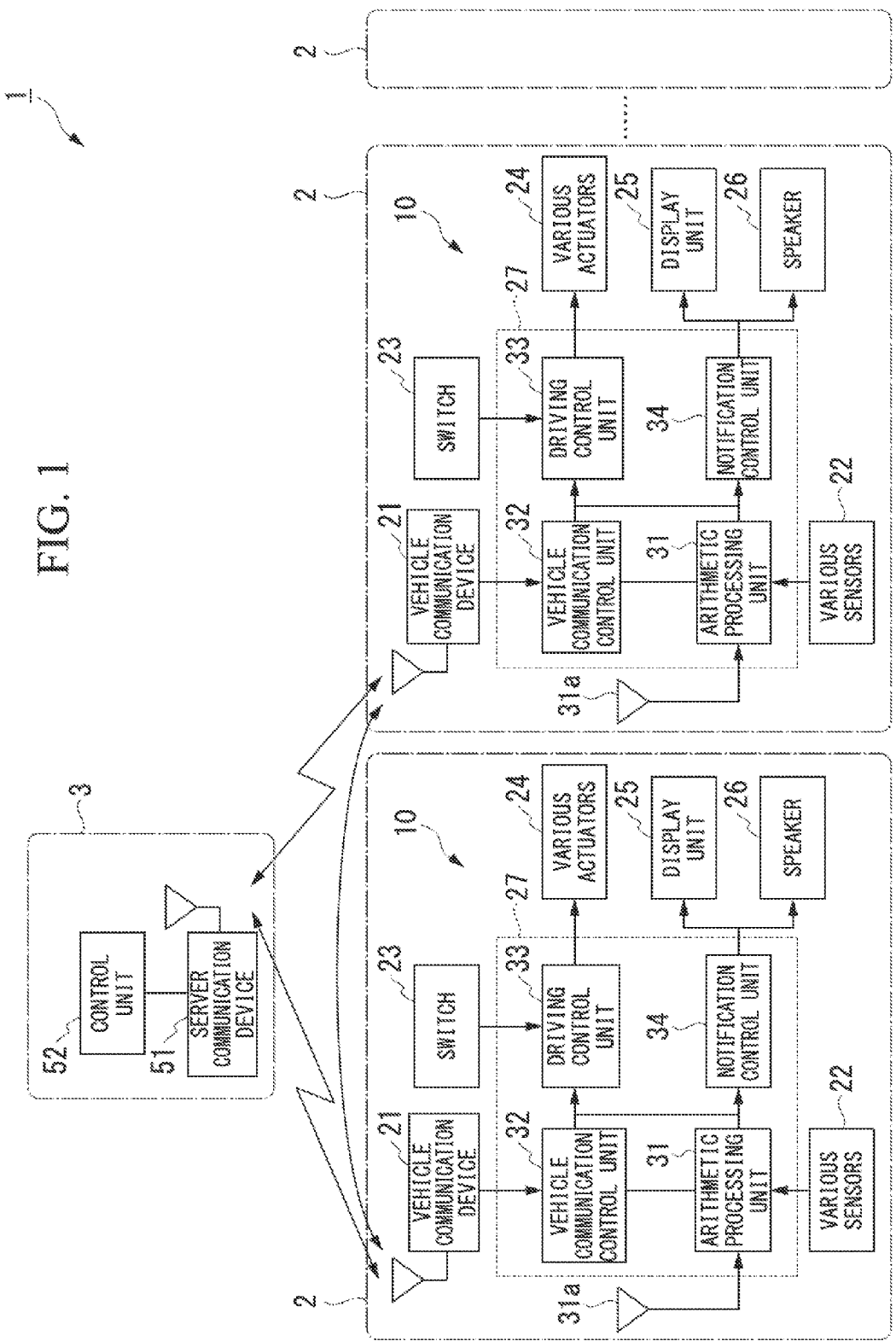
FIG. 1 is a block diagram of a synchronized driving assist system including a synchronized driving assist apparatus according to an embodiment of the present invention.

Hereinafter, an embodiment of a synchronized driving assist apparatus of the present invention will be described with reference to the appended drawings.

A synchronized driving assist apparatus 10 according to the present embodiment, for example, is installed in a plurality of vehicles 2, and configures a synchronized driving assist system 1.

The vehicle 2 is configured to be capable of communicating bi-directionally with the other vehicle 2, for example, directly by inter-vehicle communications or the like, or indirectly by wireless communications or the like via a wireless communication network system including a roadside communication apparatus, a base station, or the like.

In addition, the vehicle 2 is configured to be capable of communicating bi-directionally with a server apparatus 3, for example, by road-to-vehicle communications via a roadside communication apparatus, wireless communications or the like via a wireless communication network system including a base station or the like.

The vehicle 2 is configured to include, for example, a vehicle communication device 21, various sensors 22, a switch 23, various actuators 24, a display unit 25, a speaker 26, and a vehicle processing device 27.

The vehicle communication device 21 is capable of communicating with the vehicle communication device 21 of the other vehicle 2, for example, directly by inter-vehicle communications or the like, or indirectly by wireless communications or the like via the server apparatus 3 that configures a client-server wireless communication network system with the vehicle 2, and transmits and receives various signals.

Note that, the communication between the plurality of vehicles 2 is not limited to the above-described communication configuration; however, for example, other communications such as communications via a communication satellite may be employed.

The various sensors 22 are, for example, a vehicle speed sensor that detects a speed on the basis of a wheel speed or the like of the vehicle 2, a yaw rate sensor that detects a yaw rate of the vehicle 2, and the like, and output a signal of the detection result according to the driving state of the vehicle 2 to the vehicle processing device 27.

The switch 23 outputs, for example, a variety of signals according to the driving control of the vehicle 2 to the vehicle processing device 27.

The variety of signals which is output from the switch 23 are, for example, a signal according to the operation state (for example, operation position, or the like) of the brake pedal or the accelerator pedal by the driver, various signals according to the automatic driving control that controls the driving state of the vehicle 2 automatically corresponding to an input operation of the driver (for example, a signal that commands control start or control stop, a signal that commands an increase and a decrease of a target vehicle speed or a target inter-vehicle distance to the preceding vehicle, and the like), and the like.

The various actuators 24 are, for example, a throttle actuator that controls the driving force of the vehicle 2, a brake actuator that controls the braking of the vehicle 2, a steering actuator that controls the steering of the vehicle 2, and the like, and is driven and controlled by the control signal which is output from the vehicle processing device 27.

The display unit 25 is, for example, a variety of displays that include a display screen such as a liquid crystal display screen, a heads-up display that performs display by projection onto a front window as a display screen, a variety of lamp bodies, and the like, and performs display and lighting or lighting-off corresponding to the control signal which is output from the vehicle processing device 27.

The speaker 26 outputs an alarm sound, a voice, or the like, corresponding to the control signal which is output from the vehicle processing device 27.

Note that, the display unit 25 and the speaker 26 may be included, for example, in a variety of in-vehicle apparatuses such as a navigation apparatus.

The vehicle processing device 27 is configured to include, for example, an arithmetic processing unit 31, a vehicle communication control unit (second acceleration power spectrum acquisition section) 32, a driving control unit (control section) 33, and a notification control unit (control section) 34.

Figure 2:
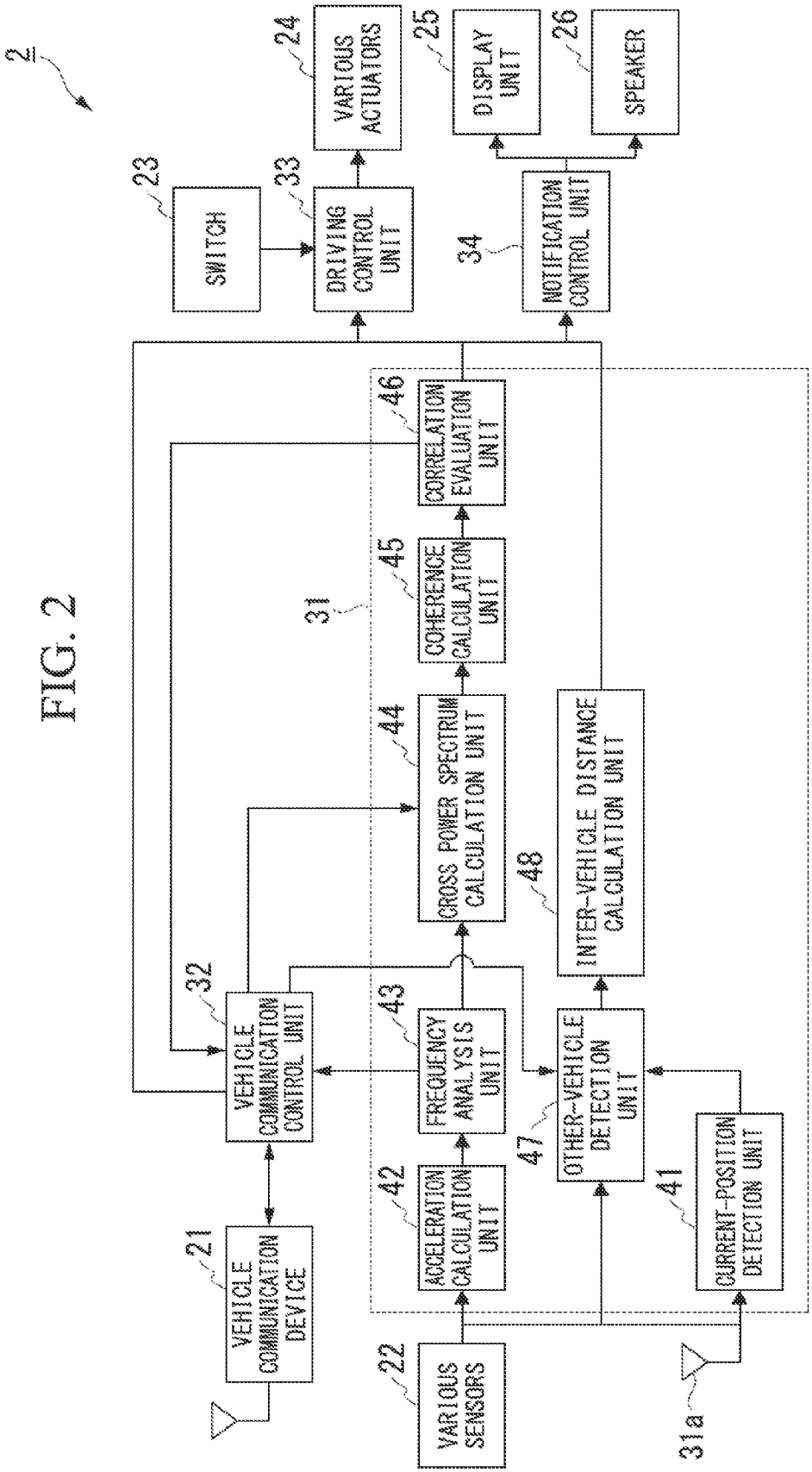
FIG. 2 is a block diagram of a synchronized driving assist apparatus installed in a vehicle according to the embodiment of the present invention.

Moreover, the arithmetic processing unit 31 is configured to include, for example, as is shown in FIG. 2, a current-position detection unit 41, an acceleration calculation unit 42, a frequency analysis unit (first acceleration power spectrum acquisition section) 43, a cross power spectrum calculation unit (cross power spectrum calculation section) 44, a coherence calculation unit (coherence calculation section) 45, a correlation evaluation unit (correlation evaluation section) 46, an other-vehicle detection unit 47, and an inter-vehicle distance calculation unit (inter-vehicle distance acquisition section) 48.

The current-position detection unit 41 detects, for example, the current position of the vehicle 2 by a positioning signal which is received by an antenna 31a that receives a positioning signal such as a GPS (Global Positioning System) signal used to measure the position of the vehicle 2 by using a satellite.

Note that, the current-position detection unit 41 may detect the current position of the vehicle 2 in combination with the arithmetic processing of autonomous navigation on the basis of a speed, a yaw rate, and the like of the vehicle 2 which are output from the various sensors 22, additionally.

The acceleration calculation unit 42 calculates, for example, the acceleration of the vehicle 2 from the temporal change of the speed or the temporal change of the current position, on the basis of information of the speed of the vehicle 2 which is output from the various sensors 22 or information of the current position which is detected by the current-position detection unit 41.

The frequency analysis unit 43 performs frequency analysis with respect to the acceleration of the vehicle 2 which is calculated by the acceleration calculation unit 42, and calculates a power spectrum corresponding to the frequency.

Figure 3:
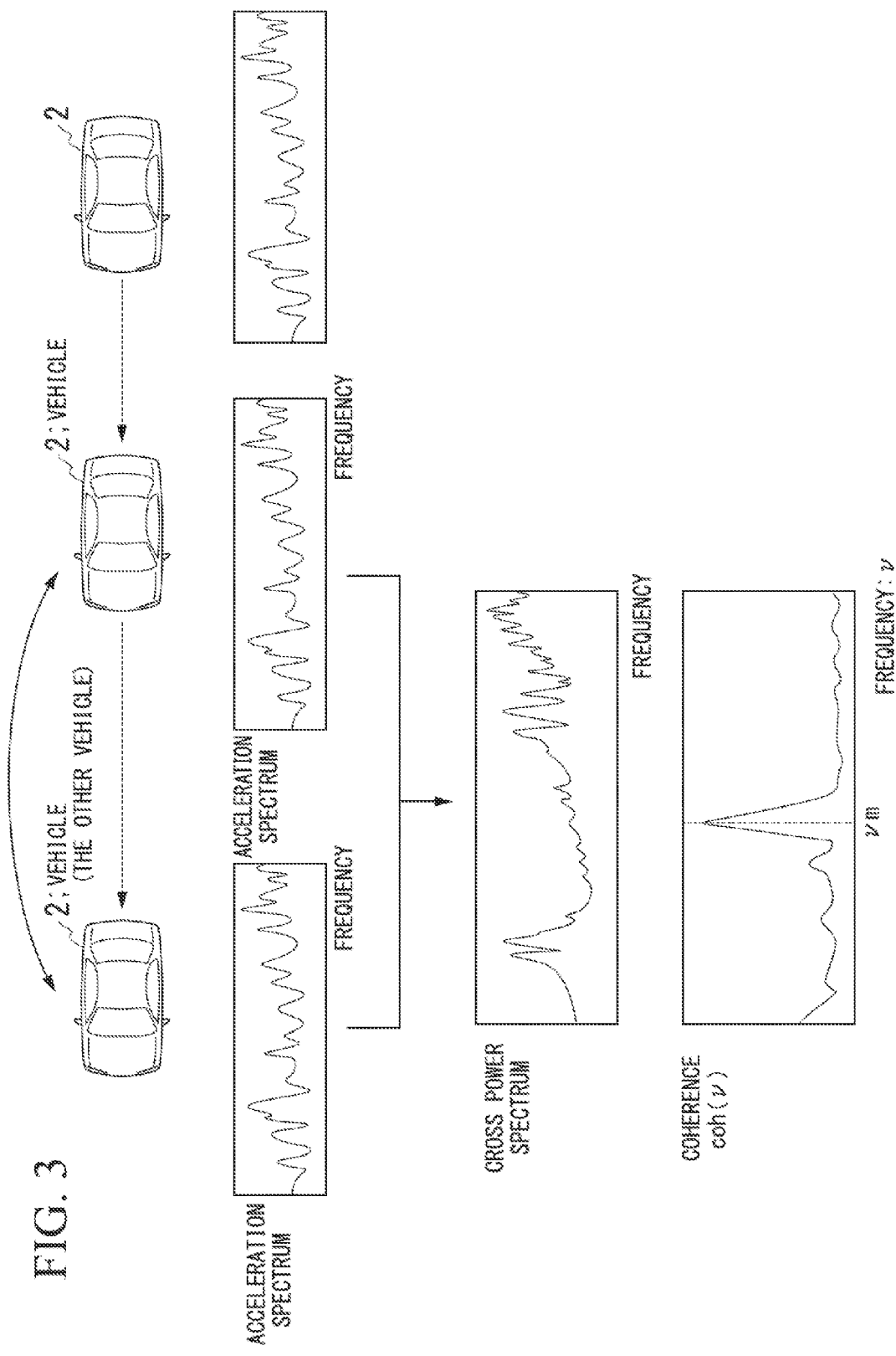
FIG. 3 is a view showing an example of an acceleration spectrum, a cross power spectrum, and coherence of the vehicle according to the embodiment of the present invention.

The cross power spectrum calculation unit 44 calculates a cross power spectrum between the ego vehicle and the other vehicle, for example, as is shown in FIG. 3, by using a power spectrum (first acceleration power spectrum) of the vehicle 2 (the ego vehicle) which is calculated by the frequency analysis unit 43 and a power spectrum (second acceleration power spectrum) of the other vehicle 2 (the other vehicle, for example, a preceding vehicle, or the like) which is acquired by the vehicle communication control unit 32 via the vehicle communication device 21.

The coherence calculation unit 45 calculates the coherence coh (v) by normalizing the cross power spectrum which is calculated by the cross power spectrum calculation unit 44.

Note that, the coherence coh (v) has an arbitrary value of 0 to 1, where the frequency v is a variable.

The correlation evaluation unit 46 evaluates the correlation in the synchronized driving of the ego vehicle and the other vehicle on the basis of the coherence coh (v) which is calculated by the coherence calculation unit 45 and outputs the evaluation result to the driving control unit 33 and the notification control unit 34.

For example, the correlation evaluation unit 46 evaluates that the correlation in the synchronized driving is high in the case that the coherence coh (v) at an arbitrary frequency v (for example, a frequency vm at which the coherence coh (v) becomes a peak value (local maximum value), or the like) is higher than a first threshold value (for example, 0.7, or the like).

In addition, for example, the correlation evaluation unit 46 evaluates that the correlation in the synchronized driving is low in the case that the coherence coh (v) at an arbitrary frequency v (for example, a frequency vm at which the coherence coh (v) becomes a peak value (local maximum value), or the like) is lower than a second threshold value (for example, 0.3, or the like).

The other-vehicle detection unit 47 detects, for example, other vehicles which exist within a predetermined range from the ego vehicle, such as a preceding vehicle, a following vehicle, or a parallel driving vehicle with respect to the ego vehicle, on the basis of, for example, information of the current position of other vehicles 2 (the other vehicle) which is acquired by the vehicle communication control unit 32 via the vehicle communication device 21 and information of the current position of the ego vehicle which is detected by the current-position detection unit 41.

The inter-vehicle distance calculation unit 48 calculates the inter-vehicle distance on the basis of the information of the current position with respect to the other vehicle (for example, a preceding vehicle, a following vehicle, or the like) which is detected by the other-vehicle detection unit 47, and outputs the calculation result to the driving control unit 33 and the notification control unit 34.

The vehicle communication control unit 32 controls transmission and reception of a variety of information by the vehicle communication device 21.

For example, the vehicle communication control unit 32 transmits the information of the power spectrum (first acceleration power spectrum) of the ego vehicle which is calculated by the frequency analysis unit 43 and the information of the current position of the ego vehicle which is detected by the current-position detection unit 41, to the other vehicle.

In addition, for example, the vehicle communication control unit 32 acquires the information of the power spectrum (second acceleration power spectrum) of the other vehicle which is transmitted from the other vehicle and is received by the vehicle communication device 11 and the information of the current position of the other vehicle.

Then, the second acceleration power spectrum is output to the cross power spectrum calculation unit 44, and the current position of the other vehicle is output to the other-vehicle detection unit 47.

The driving control unit 33 controls the driving of the ego vehicle by driving and controlling, for example, the throttle actuator, the brake actuator, and the steering actuator, on the basis of the evaluation result of the evaluation by the correlation evaluation unit 46, the inter-vehicle distance to the other vehicle which is output from the inter-vehicle distance calculation unit 48, the variety of signals which are output from the switch 23, and the signal of the detection result according to the driving state of the ego vehicle which is output from the various sensors 22.

For example, the driving control unit 33 starts or stops the performance of the automatic driving control, or performs the setting or changing of the target vehicle speed or the target inter-vehicle distance in the automatic driving control, corresponding to the signal which is output from the switch 23.

In addition, for example, the driving control unit 33 outputs a driving control signal used to maintain the current driving operation of the ego vehicle to the various actuators 24 in the case that it is evaluated that the correlation in the synchronized driving is high in the evaluation result of the evaluation by the correlation evaluation unit 46.

On the other hand, in the case that it is evaluated that the correlation in the synchronized driving is low, a driving control signal used to change the current driving operation such that the correlation is enhanced, for example, with reference to the inter-vehicle distance to the preceding vehicle, the detection result according to the driving state of the ego vehicle, and the like, is output to the various actuators 24.

Note that, the driving control signal used to maintain or change the current driving operation of the ego vehicle may be, for example, an automatic driving control signal that controls the automatic driving.

This automatic driving control signal controls, for example, the performance of such automatic driving control that sets a required target vehicle speed and a required target inter-vehicle distance and that maintains these target vehicle speed and target inter-vehicle distance (for example, constant speed driving control that matches an actual vehicle speed with the target vehicle speed, inter-vehicle distance control (for example, following driving control, or the like) that matches an actual inter-vehicle distance to the other vehicle (for example, the preceding vehicle, the following vehicle, or the like) with the target inter-vehicle distance, and the like).

For example, the driving control unit 33 can suppress the occurrence of traffic congestion by outputting the automatic driving control signal at a predetermined timing such as before the occurrence of traffic congestion.

The notification control unit 34 controls a variety of notification operations by controlling the display unit 25 and the speaker 26, on the basis of the evaluation result of the evaluation by the correlation evaluation unit 46, the inter-vehicle distance to the other vehicle which is output from the inter-vehicle distance calculation unit 48, and the signal of the detection result according to the driving state of the ego vehicle which is output from the various sensors 22.

For example, in the case that it is evaluated that the correlation in the synchronized driving is high in the evaluation result of the evaluation by the correlation evaluation unit 46, the notification control unit 34 controls the predetermined display in the display screen of the display unit 25, the predetermined lighting or lighting-off of the lamp body, and the like, or controls the output of the predetermined sound, voice, and the like from the speaker 26, and outputs a notification signal used to notify the driver of maintaining the current driving operation of the ego vehicle.

On the other hand, in the case that it is evaluated that the correlation in the synchronized driving is low, the notification control unit 34 outputs a notification signal used to notify the driver of changing the current driving operation of the ego vehicle such that the correlation is enhanced.

Note that, for example, in the case that the notification control unit 34 controls the display in the display screen of the display unit 25, the voice which is output from the speaker 26, or the like, the notification control unit 34 may notify the command of the required driving operation (for example, the increase and decrease of the inter-vehicle distance to the other vehicle, the performance of the acceleration and deceleration operations, or the like), on the basis of the inter-vehicle distance to the other vehicle or the driving state of the ego vehicle.

The server apparatus 3 is configured to include, for example, a server communication device 51 and a control unit (first acceleration power spectrum acquisition section, second acceleration power spectrum acquisition section) 52.

The server communication device 51 is capable of communicating with the vehicle communication device 21 of the vehicle 2, and transmits and receives a variety of information by a direct wireless communication connection to the vehicle communication device 21 of the vehicle 2 or a communication connection via a predetermined communication network.

For example, the predetermined communication network includes a base station for wireless communication and a public communication network such as the Internet that connects the base station for wireless communication and the server apparatus 3 by wired connection. The information which is transmitted from the server communication device 51 by wired communication is received by the base station and is forwarded from this base station to the vehicle 2 by wireless communication.

The control unit 52 controls transmission and reception of a variety of information by the server communication device 51.

For example, the control unit 52 forwards the information of the power spectrum and the information of the current position transmitted from the vehicle communication device 21 of an arbitrary vehicle 2 and received by the server communication device 51 to the vehicle communication device 21 of the other vehicles 2 around the vehicle 2.

The synchronized driving assist system 1 including the synchronized driving assist apparatus 10 according to the present embodiment includes the above-described configurations, and hereinafter the operation of this synchronized driving assist system 1 will be described.

Figure 4:
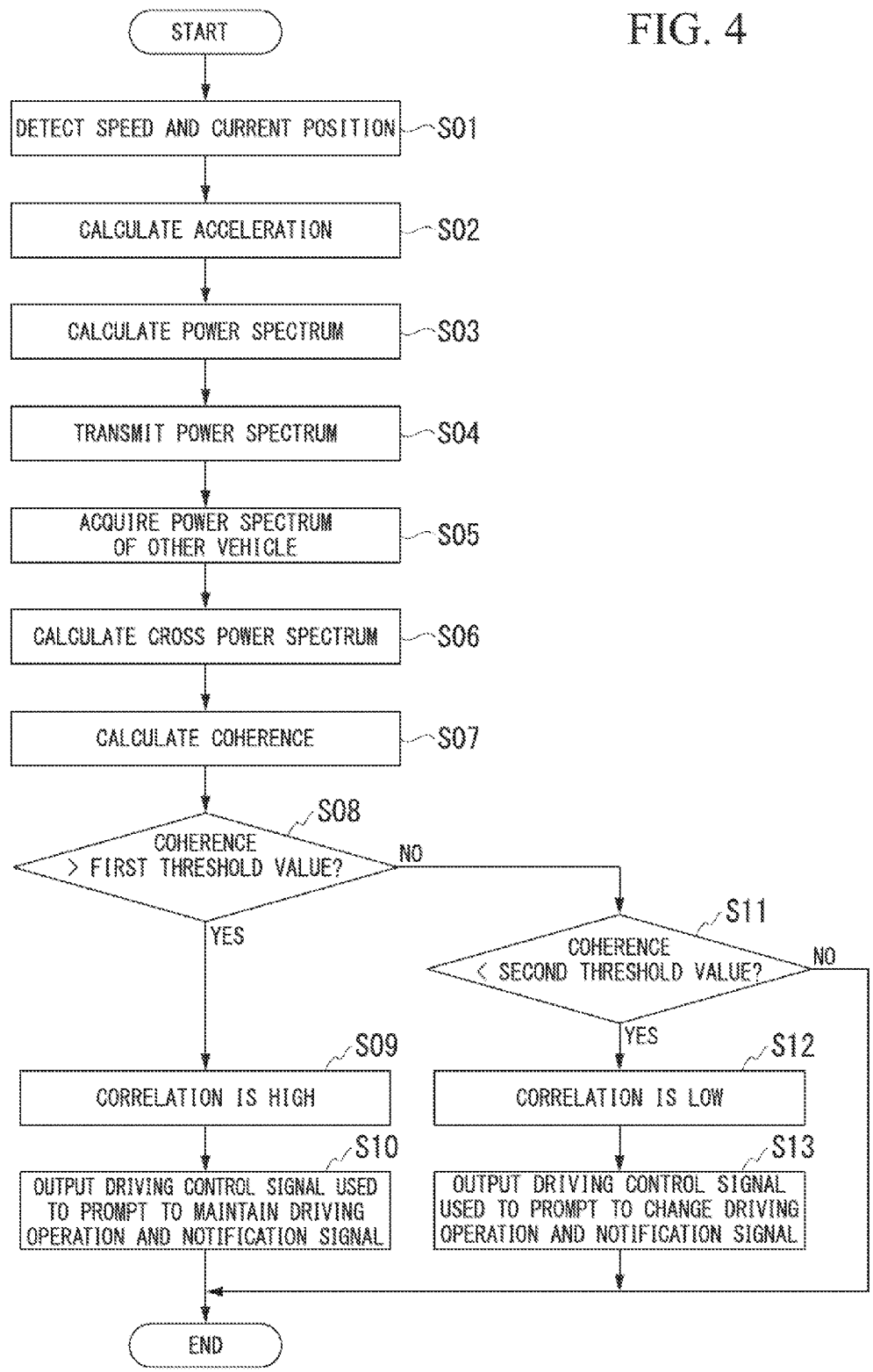
FIG. 4 is a flowchart showing an operation of the synchronized driving assist apparatus according to the embodiment of the present invention.

First, for example, in step S01 shown in FIG. 4, the speed of the vehicle 2 is detected by the vehicle speed sensor of the various sensors 22, and the current position of the vehicle 2 is detected by the current-position detection unit 41.

Next, in step S02, the acceleration of the vehicle 2 is calculated from the temporal change of the speed or the temporal change of the current position, on the basis of the speed or the current position of the vehicle 2.

Next, in step S03, frequency analysis is performed with respect to the acceleration of the vehicle 2, and a power spectrum corresponding to the frequency is calculated.

Next, in step S04, the calculated power spectrum is transmitted to the other vehicle 2.

Next, in step S05, the power spectrum transmitted from the other vehicle 2 is received.

Next, in step S06, by using the calculated power spectrum (first acceleration power spectrum) of the vehicle 2 (the ego vehicle) and the acquired power spectrum (second acceleration power spectrum) of the other vehicle 2 (the other vehicle), a cross power spectrum between the ego vehicle and the other vehicle is calculated.

Next, in step S07, the coherence coh (v) is calculated by normalizing the calculated cross power spectrum.

Next, in step S08, it is determined whether or not the coherence coh (v) at an arbitrary frequency v (for example, a frequency vm at which the coherence coh (v) becomes a peak value (local maximum value), or the like) is higher than a first threshold value (for example, 0.7, or the like).

In the case that this determination result is "YES", the routine proceeds to step S09.

On the other hand, in the case that this determination result is "NO", the routine proceeds to step S11 described below.

Then, in step S09, it is evaluated that the correlation in the synchronized driving between the ego vehicle and the other vehicle is high.

Then, in step S10, a driving control signal used to prompt to maintain the current driving operation of the ego vehicle or a notification signal that performs notification to the driver (for example, lighting of green light in the lamb body of the display unit 25, or the like) is output, and the routine proceeds to END.

Further, in step S11, it is determined whether or not the coherence coh (v) at an arbitrary frequency v (for example, a frequency vm at which the coherence coh (v) becomes a peak value (local maximum value), or the like) is lower than a second threshold value (for example, 0.3, or the like).

In the case that this determination result is "YES", the routine proceeds to step S12.

On the other hand, in the case that this determination result is "NO", the routine proceeds to END.

Then, in step S12, it is evaluated that the correlation in the synchronized driving between the ego vehicle and the other vehicle is low.

Then, in step S13, a driving control signal used to prompt to change the current driving operation of the ego vehicle or a notification signal that performs notification to the driver (for example, lighting of blue light in the lamb body of the display unit 25, or the like) is output, and the routine proceeds to END.

As described above, according to the synchronized driving assist system 1 including the synchronized driving assist apparatus 10 according to the present embodiment, since the cross power spectrum and the coherence are calculated from the power spectrum of acceleration of the vehicle 2 which is capable of being acquired in real time and easily, and the correlation in the synchronized driving is evaluated on the basis of the coherence, it is possible to evaluate the correlation in the synchronized driving accurately and with high reliability.

Moreover, on the basis of this evaluation result, it is possible to appropriately assist the synchronized driving, and it is possible to reduce the load of the driving operation, to optimize the control timing of the driving state of each vehicle 2, and to suppress the occurrence of traffic congestion or resolve the traffic congestion which has occurred.

Furthermore, by outputting the driving control signal or the notification signal depending on the result of the evaluation of the correlation in the synchronized driving and prompting the driver to maintain or change the current driving operation, it is possible to prevent the assist of the synchronized driving from providing a feeling of strangeness to the driver and to suitably reflect the intension of the driver in the driving state of each vehicle 2.

In addition, in the case that it is evaluated that the correlation in the synchronized driving is low, by prompting the driver to change the current driving operation corresponding to the inter-vehicle distance, it is possible to further appropriately assist the synchronized driving.

Moreover, for example, an additional configuration such as an external sensor that detects the outside of each vehicle 2 is not required, and it is possible to prevent an increase of the cost required for the apparatus configuration, and to evaluate the correlation in the synchronized driving while preventing an increase of the calculation load.

Figure 5:
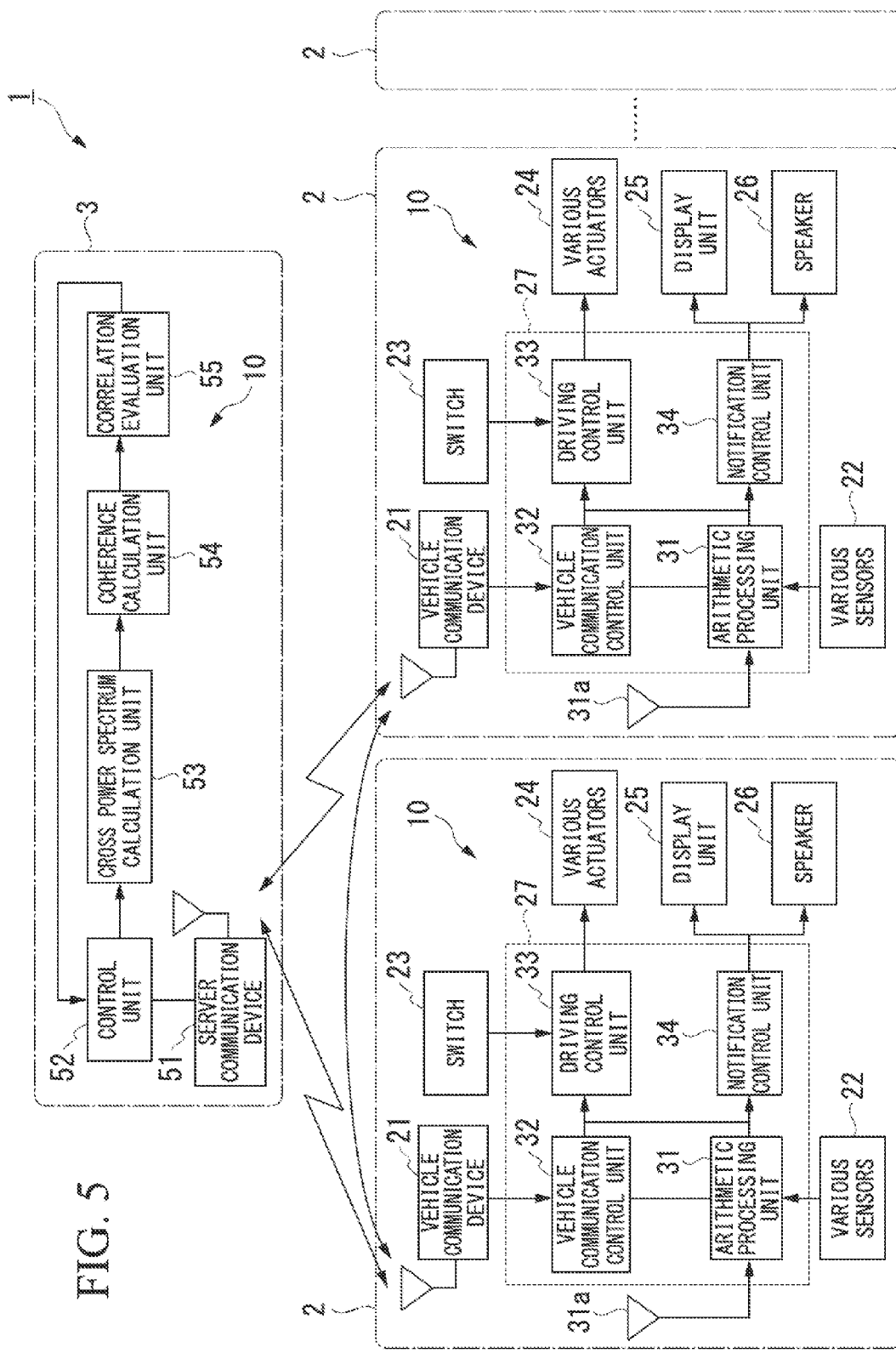
FIG. 5 is a block diagram of a synchronized driving assist system including a synchronized driving assist apparatus according to a first modified example of the embodiment of the present invention.

Note that, in the above-described embodiment, for example, as shown in a first modified example of FIG. 5, units used to realize at least part of the functions of the synchronized driving assist apparatus 10 may be included in the server apparatus 3.

In the synchronized driving assist system 1 according to this first modified example, for example, the server apparatus 3 is configured to include a server communication device 51, a control unit 52, a cross power spectrum calculation unit (cross power spectrum calculation section) 53, a coherence calculation unit (coherence calculation section) 54, and a correlation evaluation unit (correlation evaluation section) 55, and it is possible to calculate a cross power spectrum for arbitrary two vehicles 2 in the server apparatus 3.

In addition, in this first modified example, an arithmetic processing unit 31 of the vehicle 2 may include at least a current-position detection unit 41, an acceleration calculation unit 42, and a frequency analysis unit 43.

The server communication device 51 receives information of the current position and information of the power spectrum of acceleration calculated in the frequency analysis unit 43 of each of the arbitrary two vehicles 2, which are transmitted from each vehicle communication device 21.

The control unit 52 outputs information of the current position and information of the power spectrum, which are transmitted from each vehicle communication device 21 of the arbitrary two vehicles 2 and are received by the server communication device 51 to the cross power spectrum calculation unit 53.

In addition, the control unit 52 transmits the evaluation result of the evaluation by the correlation evaluation unit 55, of the correlation in the synchronized driving of the arbitrary two vehicles 2 to each vehicle communication device 21 of these vehicles 2.

The cross power spectrum calculation unit 53 calculates a cross power spectrum between these vehicles 2 by using power spectrums (first acceleration power spectrum and second acceleration power spectrum) of the arbitrary two vehicles 2 (for example, a preceding vehicle and a following vehicle, two parallel driving vehicles, or the like) which is received by the server communication device 51.

The coherence calculation unit 54 calculates the coherence coh (v) by normalizing the cross power spectrum which is calculated by the cross power spectrum calculation unit 53.

Note that, the coherence coh (v) has an arbitrary value of 0 to 1, where the frequency v is a variable.

The correlation evaluation unit 55 evaluates the correlation in the synchronized driving of the arbitrary two vehicles 2 on the basis of the coherence coh (v) which is calculated by the coherence calculation unit 54 and outputs the evaluation result to the control unit 52.

In this first modified example, each vehicle 2 that receives the evaluation result of the correlation in the synchronized driving between the ego vehicle and the other vehicle from the server apparatus 3, for example, outputs the driving control signal and the notification signal to the driving control unit 33 and the notification control unit 34 with reference to the inter-vehicle distance to the other vehicle which is output from the inter-vehicle distance calculation unit 48, the variety of signals which are output from the switch 23, and the signal of the detection result according to the driving state of the ego vehicle which is output from the various sensors 22.

According to this first modified example, it is possible to reduce the processing load according to the synchronized driving in each vehicle 2.

Moreover, it is possible to easily and appropriately assist the synchronized driving among a plurality of vehicles 2 which are present in a broad range by the server apparatus 3.

Note that, the first modified example of the embodiment is described using an example in which the server apparatus 3 receives the power spectrum transmitted from each vehicle 2; however, the invention is not limited thereto. For example, the server apparatus 3 may receive a signal of the detection result of acceleration transmitted from each vehicle 2, perform frequency analysis with respect to the acceleration of each vehicle 2, and calculate a power spectrum corresponding to the frequency.

Note that, in the above-described first modified example of the embodiment, additionally, the control unit 52 of the server apparatus 3 may output a driving control signal that controls driving of each vehicle 2 and a notification signal that performs notification to the driver of each vehicle 2 on the basis of the evaluation result of the correlation by the correlation evaluation unit 55.

Moreover, the driving control signal used to maintain or change the current driving operation of each vehicle 2 may be, for example, an automatic driving control signal that controls the automatic driving.

This automatic driving control signal is a signal used to perform, for example, a constant speed driving control that matches an actual vehicle speed with a target vehicle speed, or an inter-vehicle distance control that matches an actual inter-vehicle distance with a target inter-vehicle distance.

For example, the automatic driving control signal is output at a predetermined timing such as before the occurrence of traffic congestion, and thereby it is possible to accurately suppress the occurrence of traffic congestion.

Note that, the target vehicle speed or the target inter-vehicle distance may be included in this automatic driving control signal, or may be set by the vehicle processing device 27 of each vehicle 2 that receives this automatic driving control signal.

Note that, in the embodiment described above, the various sensors 22 may include an external sensor such as a radar apparatus used to detect the outside of the vehicle 2 (the ego vehicle), and the inter-vehicle distance calculation unit 48 may calculate the inter-vehicle distance to the other vehicle on the basis of the signal of the detection result which is output from the external sensor.

Note that, the radar apparatus (not shown in the drawing), for example, divides a detection target region which is set outside the vehicle 2 into a plurality of angle regions, and sends an outgoing signal of electromagnetic waves such as infrared lasers or millimeter waves such that each angle region is scanned.

Then, a reflection signal of reflected waves generated by the reflection of each outgoing signal at an object outside the vehicle 2 (for example, the other vehicle, or the like), a pedestrian, or the like is received. Then, a signal corresponding to the outgoing signal and the reflection signal is output to the arithmetic processing unit 31.

Note that, in the embodiment described above, the inter-vehicle distance calculation unit 48 may be omitted.

In this case, the driving control unit 33 controls the driving of the ego vehicle by driving and controlling the various actuators 24 on the basis of the evaluation result of the evaluation by the correlation evaluation unit 46, the variety of signals which are output from the switch 23, and the signal of the detection result according to the driving state of the ego vehicle which is output from the various sensors 22.

In addition, the notification control unit 34 controls a variety of notification operations by controlling the display unit 25 and the speaker 26 on the basis of the evaluation result of the evaluation by the correlation evaluation unit 46 and the signal of the detection result according to the driving state of the ego vehicle which is output from the various sensors 22.

Figure 6:
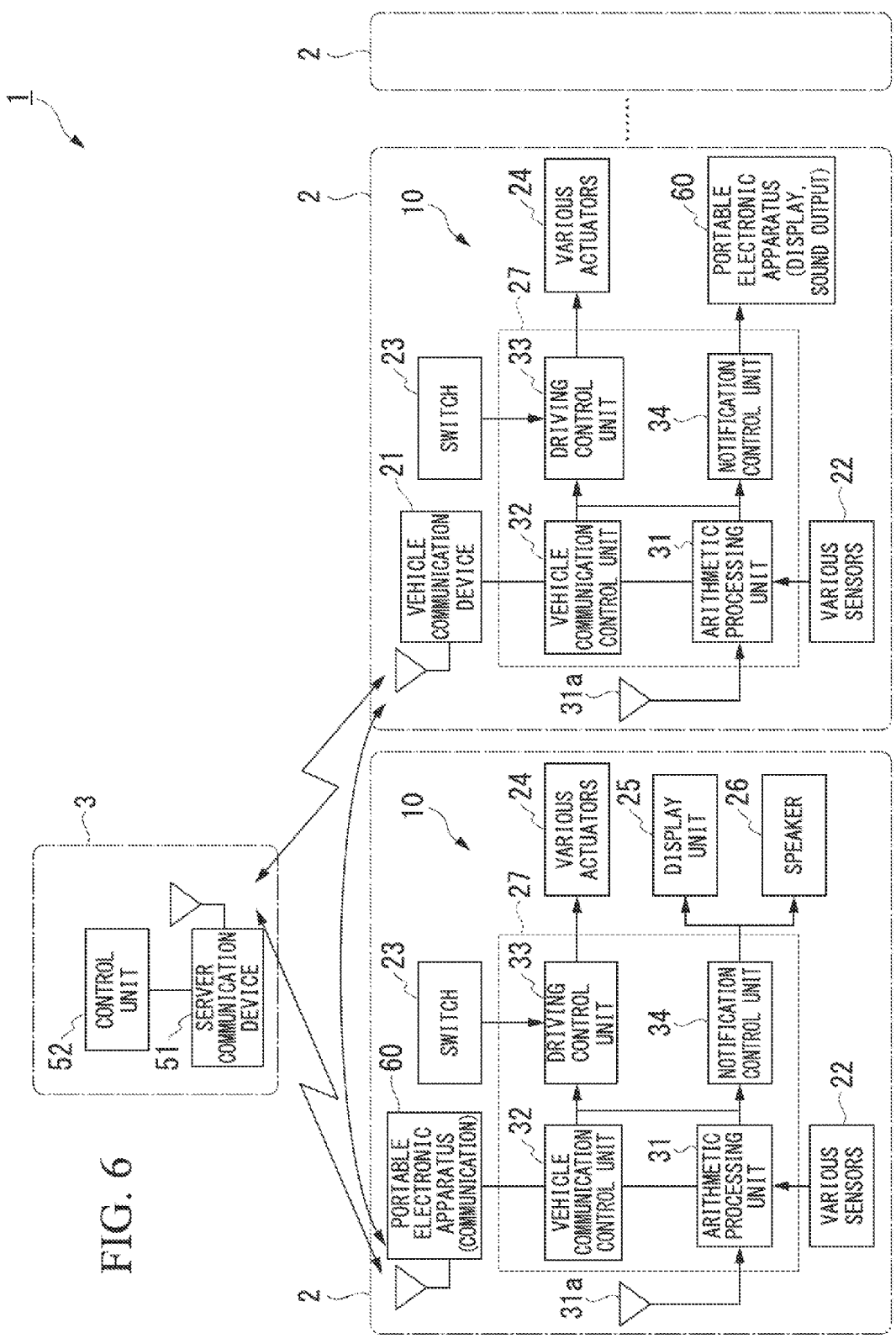
FIG. 6 is a block diagram of a synchronized driving assist system including a synchronized driving assist apparatus according to a second modified example of the embodiment of the present invention.

Note that, in the embodiment described above, for example, as shown in a second modified example of FIG. 6, the synchronized driving assist apparatus 10, for example, may include a portable electronic apparatus 60 which is carried by the driver or the occupant of the vehicle 2 or the like as a unit used to realize at least part of the functions of the synchronized driving assist apparatus 10.

For example, the portable electronic apparatus 60 includes at least any one of a communication unit (not shown in the drawing) that performs communication with the outside of the vehicle 2 (for example, communication that acquires the power spectrum of the other vehicle 2 from the outside, or the like), a display unit or a speaker (not shown in the drawing) that performs notification to the driver by display or a sound output, and an arithmetic processing unit (not shown in the drawing) that performs arithmetic processing according to the synchronized driving.

For example, in the vehicle 2 shown in FIG. 6, the communication unit of the portable electronic apparatus 60 performs all communication according to the synchronized driving between the other vehicle 2 and the server apparatus 3, and the display unit and the speaker of the portable electronic apparatus 60 perform all notification according to the synchronized driving.

Figure 7:
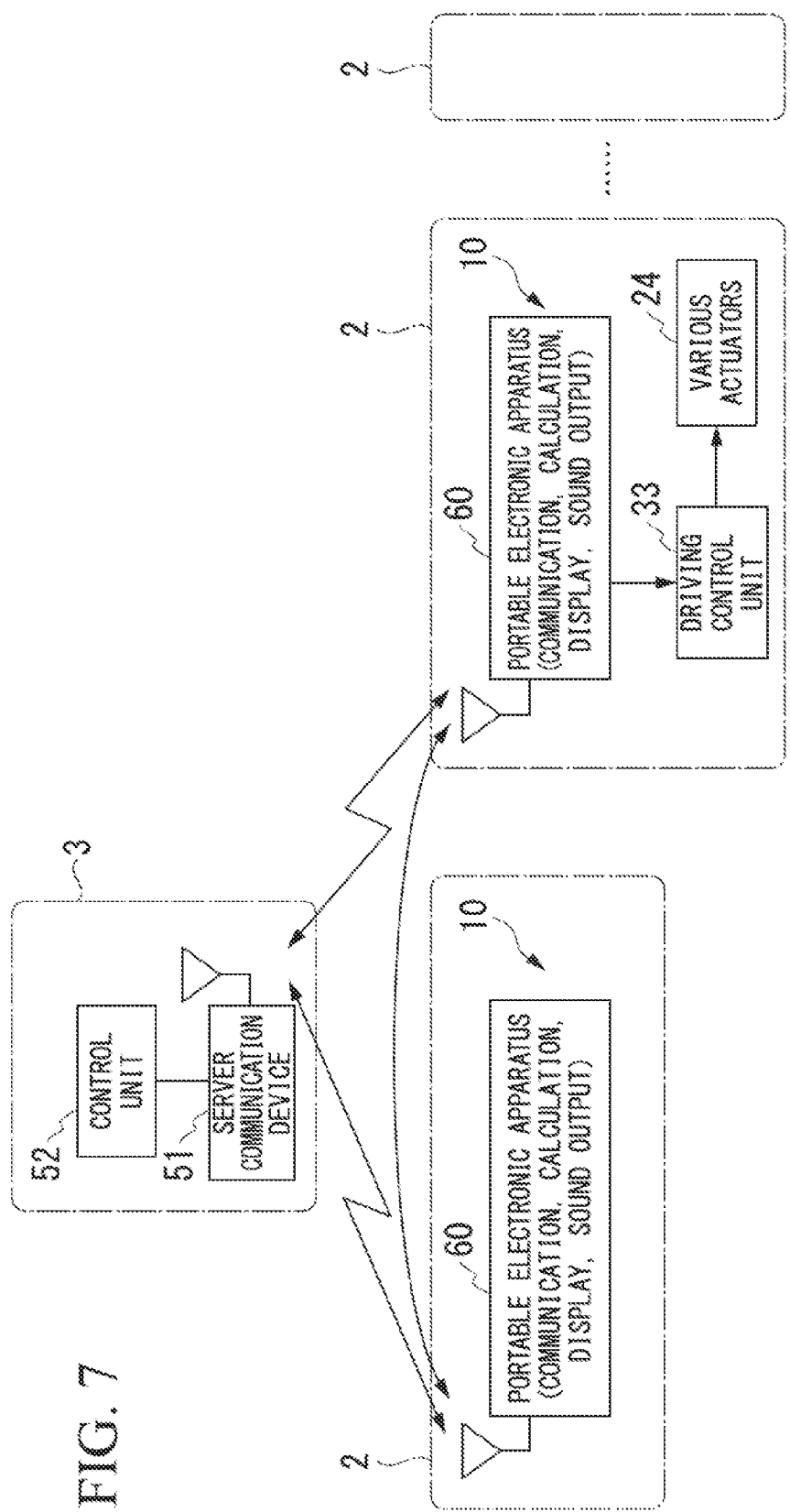
FIG. 7 is a block diagram of a synchronized driving assist system including a synchronized driving assist apparatus according to a third modified example of the embodiment of the present invention.

Moreover, in the second modified example of the embodiment described above, for example, as shown in a third modified example of FIG. 7, the portable electronic apparatus 60 may output position information used to detect the acceleration and the current position of the vehicle 2 in place of the various sensors 22.

In addition, for example, the arithmetic processing unit of the portable electronic apparatus 60 may output an automatic driving command signal which commands to perform an automatic driving according to the synchronized driving corresponding to the evaluation result of the correlation of the synchronized driving, to the driving control unit 33 of the vehicle 2.

Figure 8:
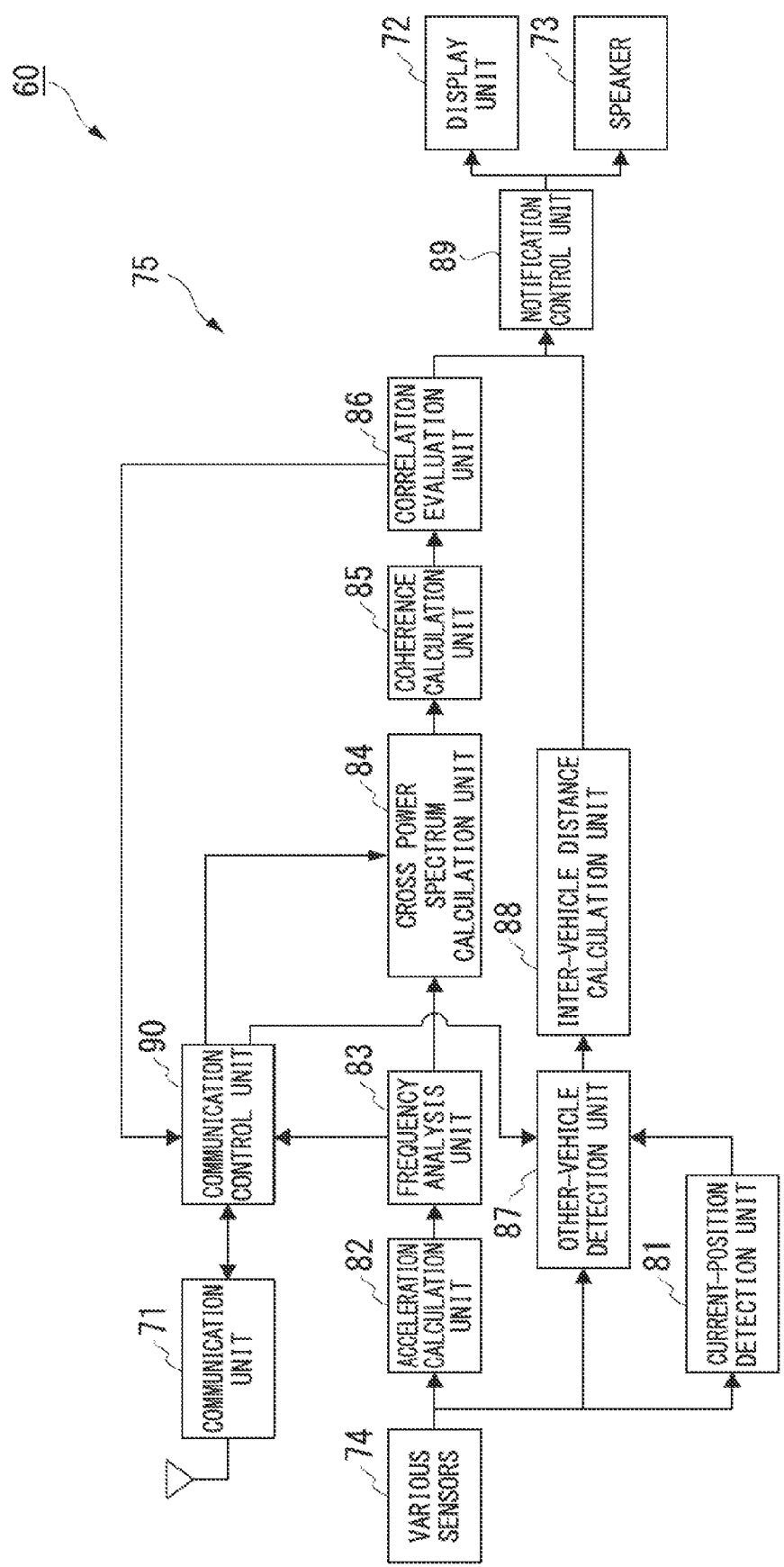
FIG. 8 is a block diagram of a portable electronic apparatus according to the third modified example of the embodiment of the present invention.

The portable electronic apparatus 60 of this third modified example, as shown in FIG. 8, for example, includes a communication unit (communication section) 71, a display unit (notification section) 72, a speaker (notification section) 73, various sensors 74, and an arithmetic processing unit (arithmetic processing section, driving control section) 75.

Moreover, the arithmetic processing unit 75 includes, for example, a current-position detection unit 81, an acceleration calculation unit 82, a frequency analysis unit 83, a cross power spectrum calculation unit 84, a coherence calculation unit 85, a correlation evaluation unit 86, an other-vehicle detection unit 87, an inter-vehicle distance calculation unit 88, a notification control unit 89, and communication control unit 90.

The communication unit 71 is capable of communicating with the outside of the vehicle 2 (for example, vehicle communication device 21 of the other vehicle 2, server communication device 51 of the server apparatus 3, or the like), and transmits and receives a variety of signals.

The display unit 72 is, for example, a liquid crystal display screen or the like, and performs display corresponding to the control signal which is output from the arithmetic processing unit 75.

The speaker 73 outputs an alarm sound, a voice, or the like, corresponding to the control signal which is output from the arithmetic processing unit 75.

The various sensors 74 are, for example, an acceleration sensor, a positioning signal receiving apparatus, and the like.

The current-position detection unit 81, for example, detects the current position of the portable electronic apparatus 60 on the basis of the positioning signal of the GPS signal received by the positioning signal receiving apparatus of the various sensors 74 or the like.

The acceleration calculation unit 82, for example, calculates the acceleration of the vehicle 2 on the basis of the acceleration which acts on the portable electronic apparatus 60 and which is detected by the acceleration sensor of the various sensors 74.

The frequency analysis unit 83 performs frequency analysis with respect to the acceleration of the vehicle 2 which is calculated by the acceleration calculation unit 82, and calculates a power spectrum corresponding to the frequency.

The cross power spectrum calculation unit 84 calculates a cross power spectrum between the ego vehicle and the other vehicle by using a power spectrum (first acceleration power spectrum) of the vehicle 2 (ego vehicle) which is calculated by the frequency analysis unit 83 and a power spectrum (second acceleration power spectrum) of the other vehicle 2 which is acquired by the communication control unit 90 via the communication unit 71.

The coherence calculation unit 85 calculates the coherence coh (v) by normalizing the cross power spectrum which is calculated by the cross power spectrum calculation unit 84.

The correlation evaluation unit 86 evaluates the correlation in the synchronized driving of the ego vehicle and the other vehicle on the basis of the coherence coh (v) which is calculated by the coherence calculation unit 85, and outputs the evaluation result.

The other-vehicle detection unit 87 detects, for example, other vehicles which are present within a predetermined range from the ego vehicle on the basis of information of the current position of other vehicles 2 (the other vehicle) which is acquired by the communication control unit 90 via the communication unit 71 and information of the current position of the portable electronic apparatus 60 (namely, the current position of the ego vehicle) which is detected by the current-position detection unit 81.

The inter-vehicle distance calculation unit 88 calculates the inter-vehicle distance on the basis of the information of the current position with respect to the other vehicle which is detected by the other-vehicle detection unit 87 and outputs the calculation result.

The notification control unit 89 controls a variety of notification operations by controlling the display unit 72 and the speaker 73 on the basis of the evaluation result of the evaluation by the correlation evaluation unit 86 and the inter-vehicle distance to the other vehicle which is output from the inter-vehicle distance calculation unit 88.

For example, in the case that it is evaluated that the correlation in the synchronized driving is high, the notification control unit 89 outputs a notification signal used to notify the driver of maintaining the current driving operation of the ego vehicle.

On the other hand, in the case that it is evaluated that the correlation in the synchronized driving is low, the notification control unit 89 outputs a notification signal used to notify the driver of changing the current driving operation of the ego vehicle.

The communication control unit 90 controls transmission and reception of a variety of information by the communication unit 71.

For example, the communication control unit 90 transmits the information of the power spectrum (first acceleration power spectrum) of the ego vehicle and the information of the current position of the ego vehicle detected by the current-position detection unit 81 to the outside (other vehicles 2 and a server apparatus 3).

In addition, for example, the communication control unit 90 acquires the information of the power spectrum (second acceleration power spectrum) of the other vehicle which is transmitted from the outside and is received by the communication unit 71 and the information of the current position of the other vehicle.

Moreover, the communication control unit 90 outputs the second acceleration power spectrum to the cross power spectrum calculation unit 84, and outputs the current position of the other vehicle to the other-vehicle detection unit 87.

Moreover, in the case that the portable electronic apparatus 60 is communicatably connected to the driving control unit 33 of the vehicle 2, the arithmetic processing unit 75 of the portable electronic apparatus 60 may output an automatic driving command signal which commands to perform an automatic driving according to the synchronized driving corresponding to the evaluation result of the correlation of the synchronized driving to the driving control unit 33.

This automatic driving command signal is a signal used to command to perform, for example, a constant speed driving control that matches an actual vehicle speed with a target vehicle speed, or an inter-vehicle distance control that matches an actual inter-vehicle distance with a target inter-vehicle distance.

Accordingly, the driving control unit 33 which receives the automatic driving command signal from the portable electronic apparatus 60 outputs an automatic driving control signal used to maintain or change the current driving operation to the various actuators 24.

Note that, the target vehicle speed or the target inter-vehicle distance may be included in the automatic driving command signal which is output from the arithmetic processing unit 75 of the portable electronic apparatus 60, or may be set by the driving control unit 33 of the vehicle 2 which receives this automatic driving command signal.

Figure 9:
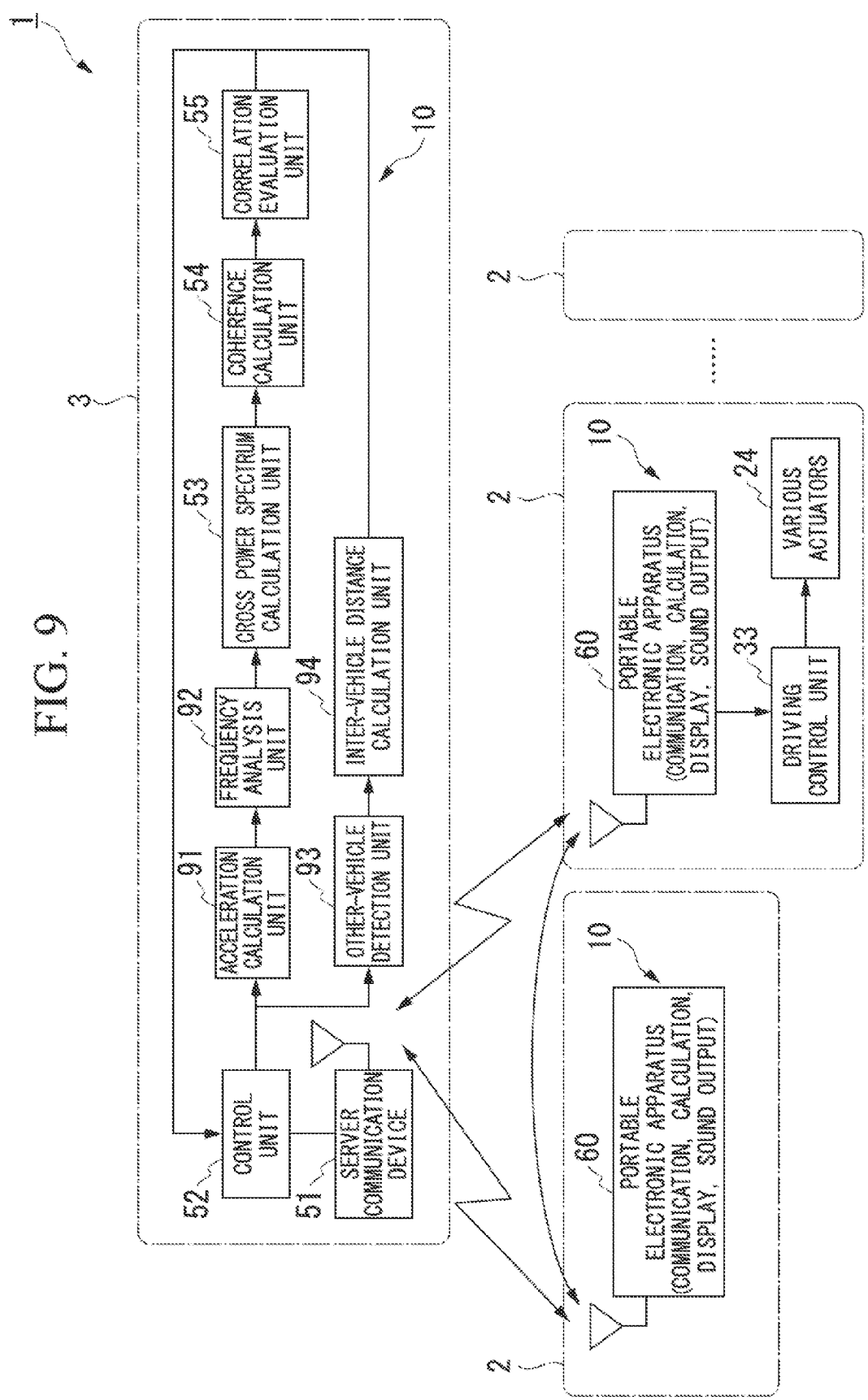
FIG. 9 is a block diagram of a synchronized driving assist system including a synchronized driving assist apparatus according to a fourth modified example of the embodiment of the present invention.

Moreover, in the third modified example of the embodiment described above, for example, as shown in a fourth modified example of FIG. 9, a unit used to realize at least part of the functions of the synchronized driving assist apparatus 10 may be included in the server apparatus 3.

In this fourth modified example, the server apparatus 3 includes, for example, the server communication device 51 of the second modified example described above, the control unit 52, the cross power spectrum calculation unit 53, the coherence calculation unit 54, the correlation evaluation unit 55, an acceleration calculation unit 91, a frequency analysis unit 92, an other-vehicle detection unit 93, and an inter-vehicle distance calculation unit 94.

In addition, in this fourth modified example, the portable electronic apparatus 60 of the vehicle 2 may include, for example, as shown in FIG. 10, at least the communication unit 71, the display unit 72, the speaker 73, the various sensors 74, the current-position detection unit 81 of the arithmetic processing unit 75, the notification control unit 89, and the communication control unit 90.

In addition, in the various sensors 74 of the portable electronic apparatus 60, the acceleration sensor may be omitted.

The acceleration calculation unit 91, for example, calculates the acceleration of each vehicle 2 on the basis of the signal of the current position which is periodically output from the portable electronic apparatus 60 of each vehicle 2.

The frequency analysis unit 92 performs frequency analysis with respect to the acceleration of each vehicle 2 which is calculated by the acceleration calculation unit 91, calculates a power spectrum corresponding to the frequency, and outputs this calculation result to the cross power spectrum calculation unit 53.

In addition, the other-vehicle detection unit 93 detects, for example, other vehicles 2 which are present around one vehicle 2 on the basis of the signal of the current position which is periodically output from the portable electronic apparatus 60 of each vehicle 2.

The inter-vehicle distance calculation unit 94 calculates the inter-vehicle distance between one vehicle 2 and other vehicles 2 on the basis of the detection result of the other-vehicle detection unit 93, and outputs the calculation result.

The notification control unit 89 of the portable electronic apparatus 60 of each vehicle 2 controls a variety of notification operations by controlling the display unit 72 and the speaker 73 as described above, on the basis of the evaluation result of the correlation in the synchronized driving which is acquired from the server apparatus 3 and the inter-vehicle distance to the other vehicle.

Moreover, in the case that the portable electronic apparatus 60 is communicatably connected to the driving control unit 33 of the vehicle 2, the arithmetic processing unit 75 of the portable electronic apparatus 60 may output an automatic driving command signal which commands to perform an automatic driving according to the synchronized driving corresponding to the evaluation result of the correlation of the synchronized driving acquired from the server apparatus 3, to the driving control unit 33.

Accordingly, the driving control unit 33 which receives the automatic driving command signal from the portable electronic apparatus 60 outputs an automatic driving control signal used to maintain or change the current driving operation to the various actuators 24.

In this fourth modified example, similarly to the above-described first modified example, the control unit 52 of the server apparatus 3 may output a driving control signal that controls driving of each vehicle 2 and a notification signal that performs notification to the driver of each vehicle 2 on the basis of the evaluation result of the correlation by the correlation evaluation unit 55.

In addition, the driving control signal used to maintain or change the current driving operation of each vehicle 2 may be, for example, an automatic driving control signal that controls the automatic driving.

According to the second modified example to the fourth modified example, by performing at least any one of communication, notification, and arithmetic processing according to the synchronized driving by using the portable electronic apparatus 60 which is carried by the driver or the occupant of the vehicle 2, it is possible to improve the versatility and the convenience.

Moreover, it is possible to make it unnecessary to preliminarily and always install an apparatus which is responsible for communication, notification, and arithmetic processing according to the synchronized driving in the vehicle 2.

Furthermore, by outputting an automatic driving control signal which commands such an automatic driving that maintains or enhances the correlation of the synchronized driving from the portable electronic apparatus 60, it is possible to improve the convenience and the versatility.

DESCRIPTION OF THE REFERENCE SYMBOLS

1: synchronized driving assist system
2: vehicle
3: server apparatus
10: synchronized driving assist apparatus
32: vehicle communication control unit (second acceleration power spectrum acquisition section)
33: driving control unit (control section)
34: notification control unit (control section)
42: acceleration calculation unit
43: frequency analysis unit (first acceleration power spectrum acquisition section)
44: cross power spectrum calculation unit (cross power spectrum calculation section)
45: coherence calculation unit (coherence calculation section)
46: correlation evaluation unit (correlation evaluation section)
47: other-vehicle detection unit
48: inter-vehicle distance calculation unit (inter-vehicle distance acquisition section)
52: control unit (first acceleration power spectrum acquisition section, second acceleration power spectrum acquisition section)
53: cross power spectrum calculation unit (cross power spectrum calculation section)
54: coherence calculation unit (coherence calculation section)
55: correlation evaluation unit (correlation evaluation section)
60: portable electronic apparatus
71: communication unit (communication section)
72: display unit (notification section)
73: speaker (notification section)
75: arithmetic processing unit (arithmetic processing section, driving control section)

The invention claimed is:

1. A synchronized driving assist apparatus comprising:
a first vehicle traveling contemporaneously and synchronously with a second vehicle;
a first speed sensor for determining the speed of the first vehicle and a second speed sensor for determining the speed of the second vehicle;
a processor configured to:
acquire a first acceleration power spectrum according to acceleration of the first vehicle based on the output of the first speed sensor;
acquire a second acceleration power spectrum according to acceleration of the second vehicle that is traveling contemporaneously and synchronously with the first vehicle based on the output of the second speed sensor;
calculate a cross power spectrum between the first vehicle and the second vehicle by using the first acceleration power spectrum and the second acceleration power spectrum;
calculate coherence from the cross power spectrum; and
evaluate correlation in synchronized driving between the first vehicle and the second vehicle on the basis of the coherence.

2. The synchronized driving assist apparatus according to claim 1, wherein the processor is further configured to: evaluate that the correlation in the synchronized driving is high in the case that the coherence is higher than a first predetermined value; and evaluate that the correlation in the synchronized driving is low in the case that the coherence is lower than a second predetermined value.

3. The synchronized driving assist apparatus according to claim 2, wherein the processor is further configured to:
output a driving control signal, which is one of a braking signal and an acceleration signal, used to maintain a current driving operation or a notification signal which performs notification to a driver in the case that the correlation in the synchronized driving is evaluated as high based on the correlation evaluation; and
output a driving control signal, which is one of a braking signal and an acceleration signal, used to change a current driving operation or a notification signal which performs notification to a driver in the case that the correlation in the synchronized driving is evaluated as low based on the correlation evaluation.

4. The synchronized driving assist apparatus according to claim 3, wherein the processor is further configured to:
acquire an inter-vehicle distance between the first vehicle and the second vehicle; and
output a driving control signal used to change a current driving operation or a notification signal which performs notification to a driver, depending on the inter-vehicle distance between the first vehicle and the second vehicle, in the case that the correlation in the synchronized driving is evaluated as low based on the correlation evaluation.

5. The synchronized driving assist apparatus according to claim 3, wherein the processor is further configured to output an automatic driving control signal that controls an automatic driving as the driving control signal.

6. The synchronized driving assist apparatus according to claim 5, wherein the processor is further configured to output a control signal that commands to match an actual vehicle speed with a target vehicle speed, or a control signal that commands to match an actual inter-vehicle distance between the first vehicle and the second vehicle with a target inter-vehicle distance, as the automatic driving control signal.

7. The synchronized driving assist apparatus according to claim 1, further comprising a portable electronic apparatus configured to perform at least any one of: communication with the outside in order to acquire at least the first acceleration power spectrum or the second acceleration power spectrum; notification to a driver; and arithmetic processing according to the synchronized driving.

8. The synchronized driving assist apparatus according to claim 7, wherein the portable electronic apparatus is further configured to: perform all communication according to the synchronized driving between each of the first vehicle and the second vehicle and the outside; and perform all notification according to the synchronized driving to each driver of the first vehicle and the second vehicle.

9. The synchronized driving assist apparatus according to claim 7, wherein the portable electronic apparatus is further configured to output an automatic driving command signal, which is one of a braking signal and an acceleration signal, which commands to perform an automatic driving according to the synchronized driving depending on an evaluation result of the correlation.

10. A synchronized driving assist system comprising the first vehicle and the second vehicle in which the synchronized driving assist apparatus according to claim 1 is installed.

11. A synchronized driving assist system comprising: the synchronized driving assist apparatus according to claim 1; and a server apparatus that is capable of communicating with a plurality of vehicles including the first vehicle and the second vehicle.

* * * * *